United States Patent
McDuff

(10) Patent No.: US 10,388,034 B2
(45) Date of Patent: Aug. 20, 2019

(54) AUGMENTING WEB CONTENT TO IMPROVE USER EXPERIENCE

(71) Applicant: International Business Machines Corporation, Armonk, NY (US)

(72) Inventor: Steve McDuff, Markham (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/494,685

(22) Filed: Apr. 24, 2017

(65) Prior Publication Data

US 2018/0307661 A1    Oct. 25, 2018

(51) Int. Cl.
| | | |
|---|---|---|
| G09B 19/00 | (2006.01) | |
| G06T 11/00 | (2006.01) | |
| G06F 17/21 | (2006.01) | |
| G06F 17/22 | (2006.01) | |
| G06F 17/27 | (2006.01) | |
| G06F 16/9535 | (2019.01) | |
| G06F 16/957 | (2019.01) | |

(52) U.S. Cl.
CPC ........ *G06T 11/001* (2013.01); *G06F 16/9535* (2019.01); *G06F 16/9577* (2019.01); *G06F 17/212* (2013.01); *G06F 17/2229* (2013.01); *G06F 17/2785* (2013.01)

(58) Field of Classification Search
USPC ........................................................ 715/234
See application file for complete search history.

(56) References Cited

U.S. PATENT DOCUMENTS

| | | | | |
|---|---|---|---|---|
| 5,036,856 | A | * | 8/1991 | Thornton ............. A61B 5/0436 600/483 |
| 8,379,053 | B1 | | 2/2013 | Phillips et al. |
| 8,676,937 | B2 | * | 3/2014 | Rapaport ................ H04L 51/32 709/219 |
| 8,930,818 | B2 | | 1/2015 | Cordasco |

(Continued)

FOREIGN PATENT DOCUMENTS

DE    102013017820 A1    4/2015

OTHER PUBLICATIONS

Andrew Schall, "The Future of UX Research: Uncovering the True Emotions of Our Users", UX User Experience, 2015, 13 pages.

(Continued)

*Primary Examiner* — Scott T Baderman
*Assistant Examiner* — Hassan Mrabi
(74) *Attorney, Agent, or Firm* — William H. Hartwell; Hunter E. Webb; Keohane & D'Alessandro PLLC

(57) ABSTRACT

Approaches presented herein enable gathering time-annotated web interaction and sensor data of web pages to extrapolate responses to a web page and generating an aggregated map indicative of those responses for improving web page user experience. Specifically, time-annotated web page interaction data from an actual web page user is captured and recorded. Also, time-annotated biometric data related to the user's web page interaction is captured and recorded using one or more biometric sensors. An emotional state of the user when viewing defined web page sections is determined based on the time-annotated physical interaction data and biometric data. The emotional states of users over a period of time are aggregated for each web page section to augment the web page sections.

20 Claims, 5 Drawing Sheets

(56) References Cited

U.S. PATENT DOCUMENTS

| | | | |
|---|---|---|---|
| 8,994,755 B2 | 3/2015 | Robinson et al. | |
| 9,076,125 B2* | 7/2015 | Manolescu | G06Q 10/10 |
| 9,311,825 B2* | 4/2016 | Lusted | G09B 19/00 |
| 9,552,056 B1* | 1/2017 | Barry | G06F 3/01 |
| 9,665,567 B2* | 5/2017 | Liu | G06F 17/279 |
| 9,854,410 B2* | 12/2017 | Krasadakis | H04W 4/06 |
| 9,922,253 B2* | 3/2018 | Asbun | H04W 4/30 |
| 9,936,916 B2* | 4/2018 | Sahin | A61B 5/486 |
| 2010/0251128 A1 | 9/2010 | Cordasco | |
| 2012/0179692 A1 | 7/2012 | Hsiao et al. | |
| 2013/0280682 A1 | 10/2013 | Levine et al. | |
| 2013/0328921 A1 | 12/2013 | Kuppusamy | |
| 2014/0184550 A1 | 7/2014 | Hennessey et al. | |
| 2015/0223731 A1* | 8/2015 | Sahin | A61B 5/16 600/301 |
| 2015/0293592 A1* | 10/2015 | Cheong | G06F 3/016 345/173 |
| 2016/0259492 A1* | 9/2016 | Le | G06F 17/30867 |
| 2017/0206691 A1* | 7/2017 | Harrises | G06T 11/60 |
| 2018/0027347 A1* | 1/2018 | Osborne | H04R 29/00 381/56 |

OTHER PUBLICATIONS

SIS International Research, "Biometrics Market Research", Copyright 2008-2015, SIS International Research, Inc., 6 pages.

* cited by examiner

AUGMENTING WEB CONTENT TO IMPROVE USER EXPERIENCE

TECHNICAL FIELD

This invention relates generally to electronic content delivery and, more specifically, to automatically augmenting web content based on aggregated emotional responses of users related to the web content.

BACKGROUND

The Internet is important for a large variety of reasons, as it now can affect and facilitate many aspects of modern life. The Internet is important in many fields, from education and healthcare to business and government. It can offer a variety of advantages that include instant communication, business opportunities, online education, work-from-home opportunities and online shopping, among others. Individuals who live in rural areas are able to easily communicate with friends, family members, and business associates with just a simple click of a mouse, and individuals around the world can easily communicate with one another via chat, email and video messaging. The Internet continues to grow and is a popular mode of communication in the world.

To that end, a successful website is becoming more of an asset to businesses, large and small, than ever before. One important ingredient to a successful website is making the user experience as pleasant as possible. The user experience can be thought of as how a user feels when navigating through a website and how they may respond, physically (in terms of actions), intellectually, and emotionally to the website. The way the user interacts with the website can help determine whether they will take action and complete the overall goal the website was designed to incite. If the user is receiving all the information they are seeking in a stimulating and efficient way, they may build trust with the website and, ultimately, the company and individuals that work for the company.

SUMMARY

In general, approaches presented herein enable gathering time-annotated web interaction and biometric sensor data of web page users to extrapolate emotional responses to a web page and generating an aggregated emotional map indicative of the emotional responses. Specifically, time-annotated web page interaction data from an actual web page user is captured and recorded. Also, time-annotated biometric data related to the user's web page interaction is captured and recorded using one or more biometric sensors. An emotional state of the user when viewing defined web page sections is determined based on the time-annotated physical interaction data and biometric data. The emotional states of users over a period of time are aggregated for each web page section to augment the web page sections. For example, the aggregated data can be used to generate an emotional or heat map of a web page by color-coding one or more web page sections of the web page for display.

One aspect of the present invention includes a computer-implemented method augmenting web content, the method comprising: capturing physical interaction data including an interaction timestamp related to a web page section of a web page; capturing biometric data including a sensor timestamp from one or more biometric sensors; correlating the interaction timestamp with the sensor timestamp to determine an emotional state related to the web page section; aggregating, to determine an aggregated emotional state, the emotional state related to the web page section with a plurality of emotional states related to the web page section stored in a repository; and augmenting, based on the aggregation, the web page section for display.

Another aspect of the present invention includes a computer program product for augmenting web content, the computer program product comprising a computer readable storage device, and program instructions stored on the computer readable storage device, to: capture physical interaction data including an interaction timestamp related to a web page section of a web page; capture biometric data including a sensor timestamp from one or more biometric sensors; correlate the interaction timestamp with the sensor timestamp to determine an emotional state related to the web page section; aggregate, to determine an aggregated emotional state, the emotional state related to the web page section with a plurality of emotional states related to the web page section stored in a repository; and augment, based on the aggregation, the web page section for display.

Yet another aspect of the present invention includes a computer system for augmenting web content, the computer system comprising: a memory medium comprising program instructions; a bus coupled to the memory medium; and a processor for executing the program instructions, the instructions causing the system to: capture physical interaction data including an interaction timestamp related to a web page section of a web page; capture biometric data including a sensor timestamp from one or more biometric sensors; correlate the interaction timestamp with the sensor timestamp to determine an emotional state related to the web page section; aggregate, to determine an aggregated emotional state, the emotional state related to the web page section with a plurality of emotional states related to the web page section stored in a repository; and augment, based on the aggregation, the web page section for display.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
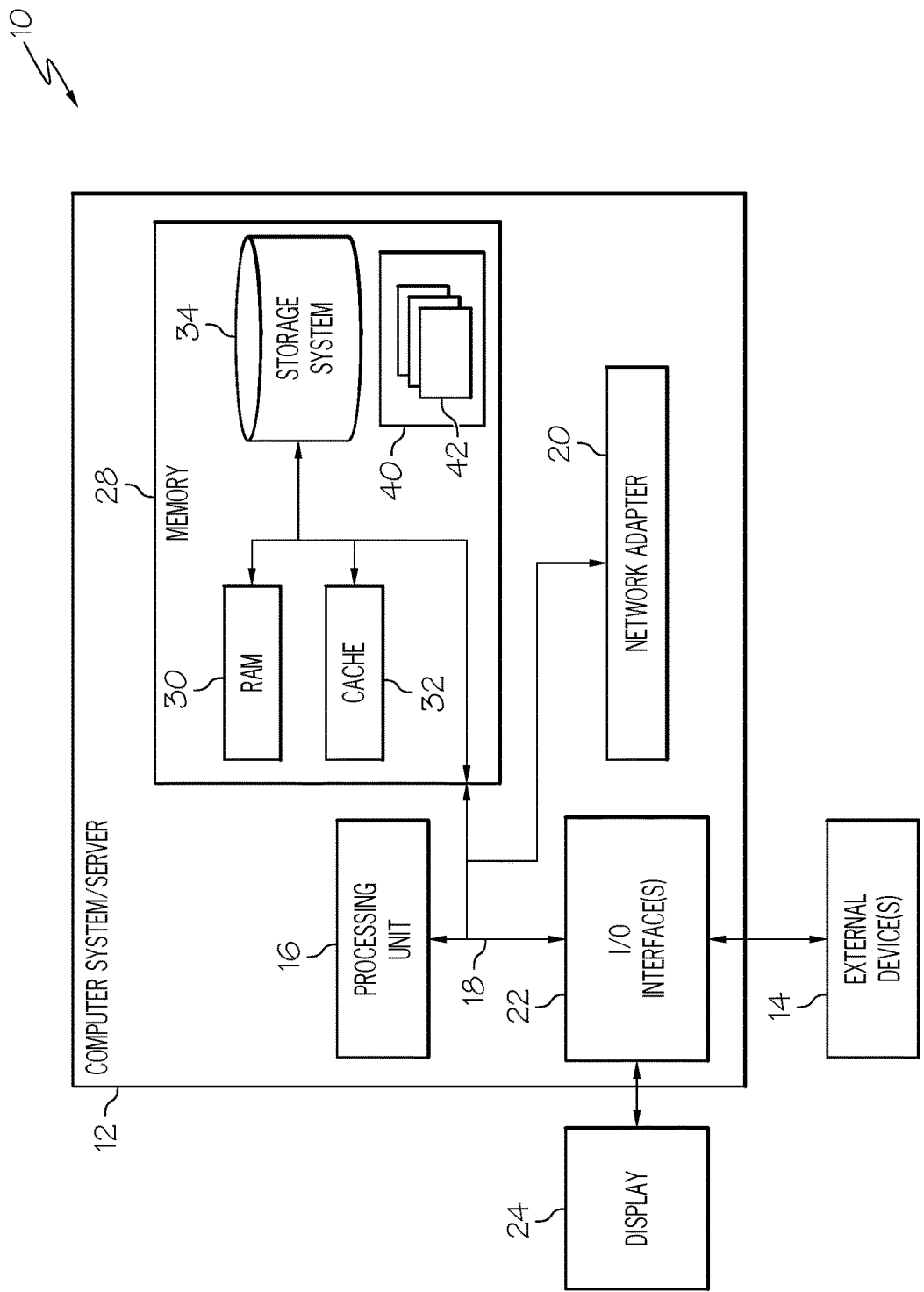
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As used herein, an administrative user may include a website owner, website administrator, owner or manager of a retail establishment, and/or any other person having the proper credentials to perform the functions described herein.

As stated above, embodiments of the present invention enable gathering time-annotated web interaction and biometric sensor data of web page users to extrapolate emotional responses to a web page and generating an aggregated emotional map indicative of the emotional responses. Specifically, time-annotated web page interaction data from an actual web page user is captured and recorded. Also, time-annotated biometric data related to the user's web page interaction is captured and recorded using one or more biometric sensors. An emotional state of the user when viewing defined web page sections is determined based on the time-annotated physical interaction data and biometric data. The emotional states of users over a period of time are aggregated for each web page section to augment the web page sections. For example, the aggregated data can be used to generate an emotional or heat map of a web page by color-coding one or more web page sections of the web page for display.

User experience is becoming an increasingly popular feature of the digital landscape. It has been shown that online consumers are less likely to return to a website after a bad experience. User experience is driven by design. Techniques exist for online retailers to identify areas of their website that get more attention than others. They may help to identify where users are spending the most time on the site. However, the attention of users is not correlated with their emotional states. For example, a user may focus a long time on a particular area of the website because the user is enjoying that area or because the user is stuck and frustrated.

The inventors of the invention described herein have recognized certain deficiencies in known methods for determining emotional responses of users to different areas of a website. In recent years, the importance of the user experience has become obvious as retailers are investing more and more into its research and development. Be it physical or digital, a product or service may arouse both an emotional and intellectual response in its consumer based not only on the way it works, but also how it looks and feels. The user experience can have an effect on sales for the retailer.

In certain embodiments, an advantage of this approach includes providing a website owner/administrator insight into which sections of a web page are providing a positive user experience and which sections are not. By being able to easily distinguish the effectiveness of the different sections, only the sections not providing a positive user experience may need to be adjusted, rather than the entire web page, saving time and costs to the website owner/administrator. The approach described herein provides an augmented web page, which allows for the website owner/administrator the ability to focus only on those web page sections that need attention to improve the user experience.

Referring now to FIG. 1, a computerized implementation 10 of an embodiment for gathering time-annotated web interaction and biometric sensor data of web page users to extrapolate emotional responses to a web page and generating an aggregated emotional map indicative of the emotional responses will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for gathering time-annotated web interaction and biometric sensor data of web page users to extrapolate emotional responses to a web page and generating an aggregated emotional map indicative of the emotional responses. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for gathering time-annotated web interaction and biometric sensor data of web page users to extrapolate emotional responses to a web page and generating an aggregated emotional map indicative of the emotional responses, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/ server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
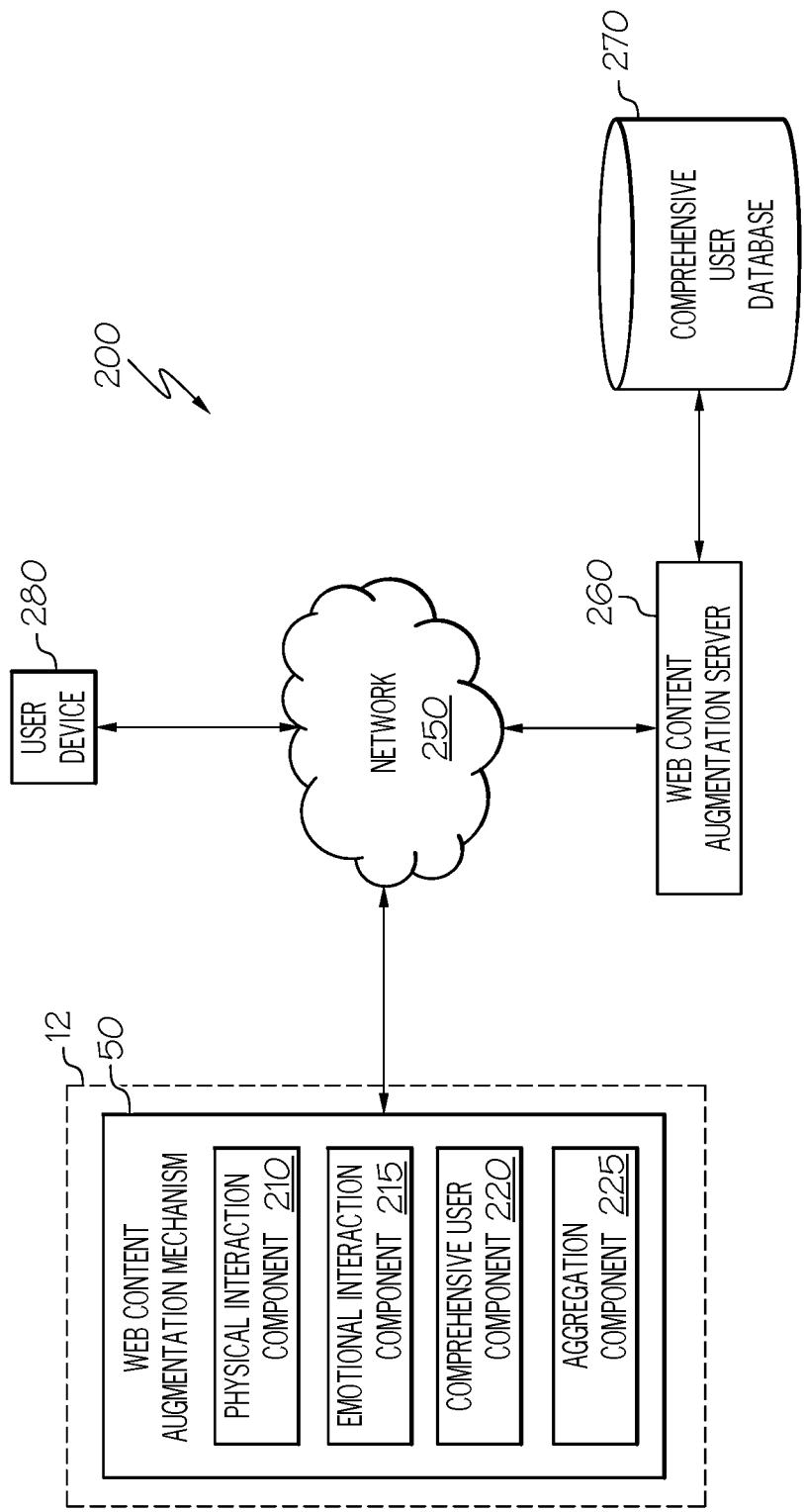
FIG. 2 shows a schematic diagram 200 illustrating an exemplary environment for implementation according to illustrative embodiments.

Referring now to FIG. 2, a block diagram 200 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a web content augmentation mechanism 50 (hereinafter "system 50"). Rather, system 50 could be loaded on a server or server-capable device that communicates (e.g., wirelessly) with the physical server to indicate a repudiation of social media content.

Regardless, as depicted, system 50 can be implemented as program/utility 40 on computer system 12 of FIG. 1 and can enable the functions recited herein. It is further understood that system 50 can be incorporated within or work in conjunction with any type of system that receives, processes, and/or executes commands with respect to IT resources in a networked computing environment. Such other system(s) have not been shown in FIG. 2 for brevity purposes. As shown, web content augmentation mechanism 50 includes physical interaction component 210, emotional interaction component 215, comprehensive user component 220, and aggregation component 225. The functions/acts of each component are described in detail below.

As shown, web content augmentation mechanism 50 may be communicatively coupled with a web content augmentation server 260 via a network 250. The network 250 may be any type of network or any combination of networks. Specifically, network 250 may include wired components, wireless components, or both wired and wireless components. In an embodiment, web content augmentation server 260 generally operates to obtain/maintain comprehensive user data (e.g., physical interactions, biometric data, extrapolated emotional states, etc.) in comprehensive user database 270.

Also, as shown, user device 280 may include any computing device capable of interacting with a website via network 250. User device 280 may be a mobile smart phone, mobile gaming device, personal computer, laptop computer, watch, tablet, or the like. Comprehensive user database 270 may include a relational database, which can be implemented in a combination of hardware (i.e., physical data storage hardware) and software (i.e., relational database software). Although comprehensive user database 270 is shown as separate from web content augmentation server 260, comprehensive user database 270 may be integral to or separate from web content augmentation server 260.

Physical interaction component 210 of system 50, as executed by computer system/server 12, is configured to capture time-annotated website interaction data from an actual user perspective. In essence, physical interaction component 210 may record what each user does and sees. It can provide visibility into the online user experience by capturing details of users' visits. In an embodiment, physical interaction component 210 captures and records what each user is doing and seeing in real time on every page and across all website visits, down to the page-by-page, browser-level experience. By capturing every single user's visit, as well as the reaction of the website in response to the user's requests, physical interaction component 210 captures both the quantitative and qualitative details of every single interaction. This data can then be used towards optimizing the user experience. For example, physical interaction component 210 can identify what campaigns or interactions on a retail store website triggered a user session to end prematurely and result in an unwanted outcome for the retail store. In another example, physical interaction component 210 may find that when users misspell a vacation package name on an online travel agency website and receive zero search results, nearly 100 percent of the users leave the website without completing a booking.

The data collected by physical interaction component 210 can include the referring domain, the referring uniform resource locator (URL), browser agent information, the originating Internet Protocol (IP) address, mouse events (e.g., click, hover, double click, right click, onClick, on MouseOver, on Focus, on Blur, scrolls, etc.), keyboard events (e.g., key down, key up, character entered), screenshots of a user's view, event data, event object data, click location, event time, event duration, link events, link object names, link object values, link destinations, browser size, device screen size, specific form data including values, or the price of the goods they purchased, interactions within media files, partial form completions, and form submitting.

Further collected data can include bounce rate which is the percentage of visits where the user enters and exits at the same page without visiting any other pages on the website in between. Recorded data may additionally include, but is not limited to, visibility time, which is time a single page (e.g., a blog, ad banner, etc.) is viewed; session duration, which is an average amount of time that users spend on the website each time they visit; a page view duration/time on a page, which is an average amount of time that users spend on each page of the site; a page depth/page views per session, which is the average number of page views a user consumes before ending their session; frequency per unique user, which measures how often users come to the website; a click path which is the sequence of hyperlinks one or more website users follows on a given site; the first page being the page that was visited first; and the page from which the website was exited; IP address; country code; screen resolution; browser and browser version; window size; JavaScript support; and regional settings.

In an embodiment, each collected user action (e.g., mouse events, keyboard events, eyeball tracking from a camera, etc.) may be stored in comprehensive user database 270. Each user action is stored with an associated interaction timestamp of when the action was performed. Recording everything from mouse moves and clicks to actual keystrokes can give a highly qualitative, detailed view into what each user is focusing on and interacting with inside the web pages themselves.

Emotional interaction component 215 of system 50, as executed by computer system/server 12, is configured to capture time-annotated biometric data related to a user's website interaction using one or more biometric sensors. The one or more biometric sensors may be integrated into user device 280 (e.g., built-in camera, device case, watch band, etc.) and/or may be external to user device 280 (e.g., external camera, heart monitor, wrist band, arm band, head gear, smart clothes, etc.). In an embodiment, biometric responses may be automatically detected using physiological signal measurement, such as via an explicit button on user device 280, or via a continuous biometric data collector. In an embodiment, the biometric data collector is associated with user device 280, such as a phone or tablet case that incorporates sensors to collect data from the hands of a user. Biometric data may include, but is not limited to, galvanic skin response to measure emotional arousal, heart response, accelerometer to determine activity level, skin temperature, breathing, muscle tension, blood pressure, sedation level, pupil dilation, eye tracking, facial expressions, or a combination thereof. In an embodiment, collected biometric data may be stored in comprehensive user database 270.

In an embodiment, each piece of biometric data may be stored with an associated sensor timestamp and a location on a web page where the particular emotion was felt at a time when the biometric data was collected. For example, with eye tracking, biometric data may be stored along with a URL and X and Y screen coordinates related to the web page. The X and Y coordinates may be represented by any meaningful measurement, such as inches, centimeters, pixels, etc. This information can be used when distinguishing different web page sections (e.g., via color-coding, etc.) of the web page (discussed in detail below).

Comprehensive user component 220 of system 50, as executed by computer system/server 12, is configured to determine an emotional state of a user regarding defined web page sections based on the time-annotated physical interaction data and biometric data. Typically, a web page will include distinctive web page sections such as navigation, one or more content sections (e.g., main and complementary content), headers, and/or footers. In an embodiment, each web page section may be physically defined by an administrative user via a user interface of a display. In another embodiment, each web page section may be logically defined by content and/or function. Properties related to each defined web page section, such as position, width, height, etc., may be stored (in pixels) in a repository (not shown). One or more sets of properties may be stored for each defined web page section based on browser, device type, etc.

Figure 3A:
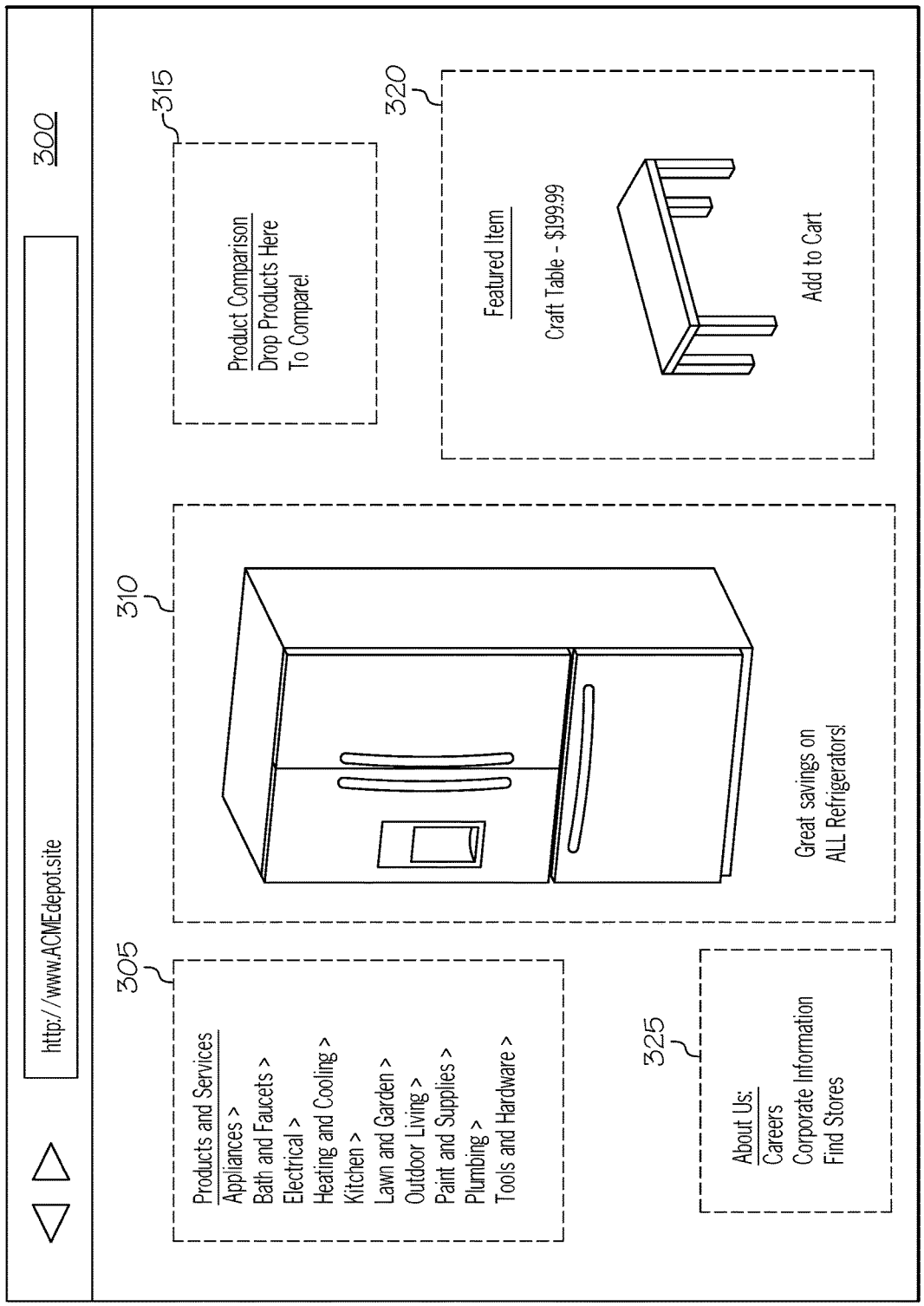
FIG. 3A shows an example web page 300 including five web page sections according to illustrative embodiments.

FIG. 3A shows an example web page 300 for retailer Acme Depot. As shown, web page 300 includes five defined web page sections. The dotted lines around the different sections are included for reference only and may not be displayed to a user. Section 305 lists available product and services. Section 310 shows a refrigerator image and a message indicating a sale on all refrigerators. Section 315 shows a product comparison area in which a user is invited to "drop" products to compare with one another. However, as shown, section 315 does not provide instructions on exactly how to drop products. It is not clear whether a user can enter product numbers or descriptions, copy/paste images, or perform other actions to generate a product comparison. Section 320 shows a feature time of a craft table. Section 325 shows an informational section in which a user can learn more about Acme Depot, such as careers, corporate information, and where to find Acme Depot stores.

Existing techniques known in the art for predicting valence, arousal, and engagement, and resonance may be used to determine the emotional state of the user. Emotional responses are known to have two components: arousal and valence. Arousal reflects the intensity of the response, while valence refers to the direct emotional response ranging from positive to negative. The biometric data may indicate a positive response (e.g., excited), a negative response (e.g., frustrated, confused, etc.), or neutral response. In some instances, an emotional response may not be detected, such as due to a lack of sufficient biometric data being collected. Websites are effective when they are able to arouse responses in users such as enjoyment, involvement, trust, or satisfaction, and will more often be successful in enticing users to return to the site.

Comprehensive user component 220 may be configured to correlate a particular emotional state of a user with a web page section based on the collected physical interaction data and biometric data. In an embodiment, a timestamp of the physical interaction data may be aligned with a timestamp of the biometric data and an associated screen location to correlate a user's emotional state to one or more web page sections. For example, a user's physical interactions (e.g., clicks, mouse moves, etc.) may be directed at section 305 while having a positive emotional response based on the collected biometric data at the time of the physical interactions. The user may have clicked on several products and services links and had a pleasant experience as evidenced by the collected biometric data at that time.

Conversely, later in the user session, the biometric data collected while the user was interacting with section 315 (i.e., product comparison) may indicate the user was confused and frustrated. For example, a built-in camera on a device of the user may show the user was grimacing at a time a biometric sensor showed an elevated pulse rate, indicating the user was not enjoying the experience of interacting with section 315. The user may have been unable to successfully perform a product comparison leading to a negative user experience. Additionally, the user showed no biometric response when viewing details about the featured item of section 315. In an embodiment, each correlated emotional state may be stored in comprehensive user database 270 or other repository.

Aggregation component 225 may further be configured to aggregate the emotional states of all or a subsection (e.g., by gender, age, etc.) of users over a predefined and/or configurable time range (e.g., past week, past month, etc.) for each defined web page section to determine an aggregated emotional state for each respective web page section. Any number of the defined web page sections may then be augmented based on the aggregated emotional state related to the each respective web page section. In an embodiment, the aggregated data can be used to generate an emotional or heat map of a web page by color-coding one or more web page sections of the web page using predefined and/or configurable emotional response rules.

Figure 3B:
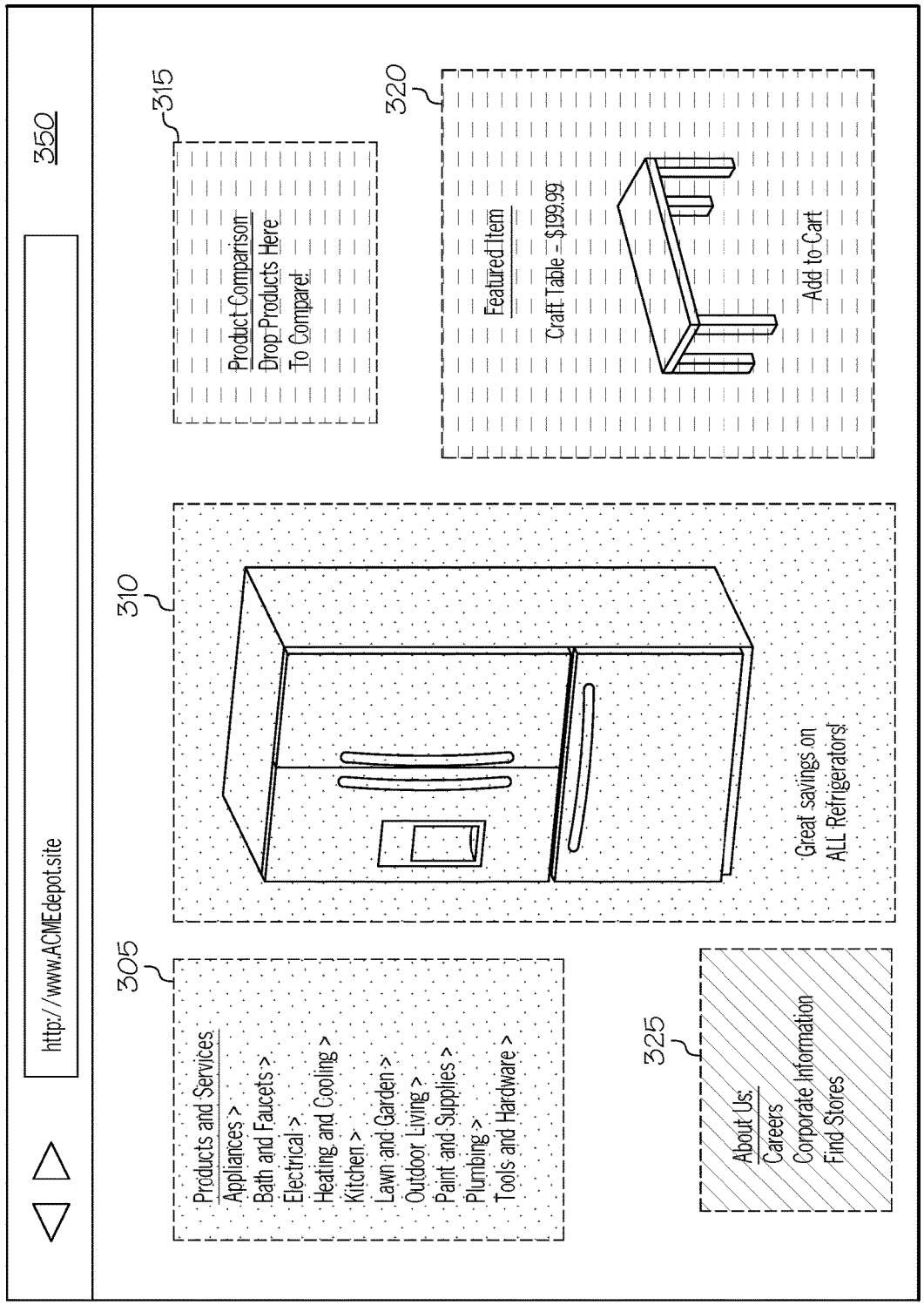
FIG. 3B shows an example augmented web page 350 including five web page sections according to illustrative embodiments.

FIG. 3B shows an example augmented web page 350 for retailer Acme Depot. As stated, predefined and/or configurable emotional response rules may be used to generate an emotional or heat map of web page 350. For example, a predefined threshold value of 70% may be defined for positive, neutral, and negative aggregated emotional states. To that end, a web page section showing 70% or more of the users interacting with the web page section had a positive response may be shaded in a green color. A web page section showing 70% or more of the users interacting with the web page section had a neutral response or an undetectable response may be shaded in a yellow color. In addition, a web page section showing 70% or more of the users interacting with the web page section had a negative response may be shaded in a red color. In an embodiment, aggregation component 225 may display the augmented web page to a display of an administrative user. Typically, an augmented web page would not be displayed to a user.

Using an augmented web page, a retailer can analyze the emotional responses to the different web page sections and take steps to improve the user experience. Referring back to FIG. 3B, assume that 73% of users had a positive emotional response (e.g., joy) when interacting with sections 305 and 310. This shows that users are generally happy with the products and services section, as well as the refrigerator sale campaign. Conversely, assume that 89% of users interacting with section 315 had a negative emotional response (e.g., frustration) and 73% of users had a negative emotional response to section 320. Acme Depot may conclude that the production comparison section needs to be redesigned to be easier to use and that the featured item may need to be replaced.

It should be noted that color-based annotations are not limited to positive, neutral, and negative classifications. An annotation can be comprised of any emotional response that can be derived from the collected biometric data. For example, a blue shading may be used for a curious response, gray for confusion, purple for frustration, red for sadness, green for joy, yellow for laughter, and so on. In addition, although color-coding is used as an example for indicating the aggregated emotional response to each section, this method is indicative only and other methods for distinguishing the different web page sections may be used such as displaying emojis, stars, text, or the like. In an embodiment, an administrative user may define any methods for distinguishing the different web page sections (e.g., via color-coding) and any related methods (e.g., exceeding threshold values for positive, negative, neutral aggregated emotional responses) for making the distinctions.

In an embodiment, page-level statistics may be displayed indicating an overall emotional response to the web page as a whole. For example, an aggregated emotional response may be generated by taking the average of the responses to each web page section of the web page. Referring back to FIG. 3, the aggregated emotional response to web page 300 may show that 10% of users felt frustrated with the page in general, while 40% of the users felt excited. Acme Depot may be delighted to know that the most prominent feeling of the web page was excitement and that this percentage could likely grow with just a few small tweaks.

In an embodiment, any number of pages of a site may be augmented using the methods described above for generating an augmented web page. For example, the same color-coding processed discussed above may be applied to a site map. A site map may represent a list of pages on a site and how the pages are connected to each other. The methods described herein may apply color-coding on the site map to show the aggregate emotional response per page so that an administrative user of the site can view the emotional responses that are being created from the various pages of the site.

In an embodiment, a site-level map of statistics may be displayed indicating how the emotions of customers were impacted as they navigated through various web pages of a website. A website may include any number of related web pages. For example, an overall neutral emotional state may be shown for a home page and a checkout payment page of the site. A promotions page and products page may show that users generally felt excited about these pages. However, a checkout shipping page may indicate that customers generally felt frustrated with their experience with this page prompting a retailer to make updates to the page in order to improve the user experience of its customers.

In an embodiment, an administrative user may define any rules and/or time ranges via a display to be used when generating an augmented web page. For example, assume the refrigerator sale for Acme Retail went into effect five days ago along with a radio advertisement promoting the sale. Acme Retail may wish to generate an augmented map for the web page advertising the sale for the last five days and then the last two days to ensure that customers who may be coming to the website specifically to review the sale continue to have a positive emotional response to the web page. If the augmented web page shows that this is not the case, Acme Retail may make one or more adjustments (e.g., provide more images and/or better product descriptions, etc.) to the web page in hopes of keeping its potential customers happy.

Figure 4:
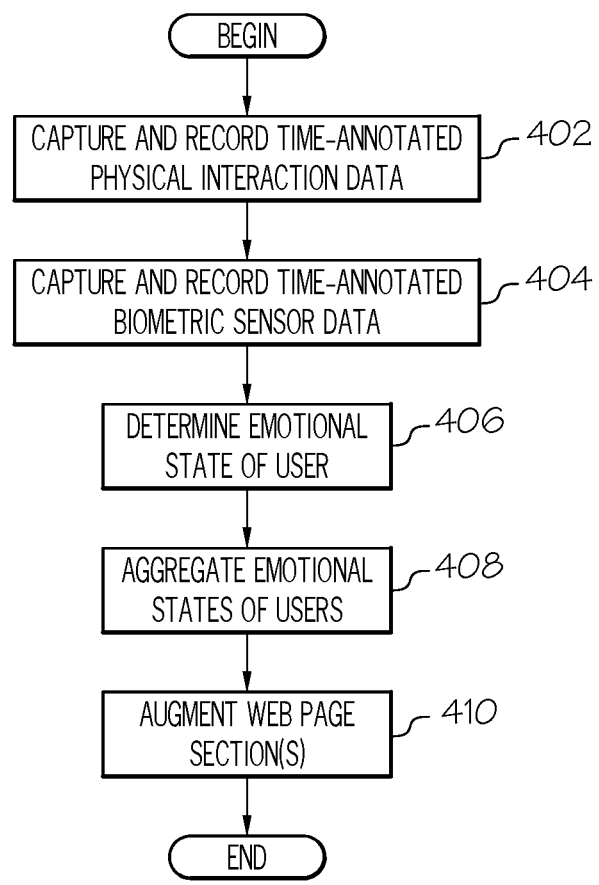
FIG. 4 shows a process flowchart 400 for gathering time-annotated web interaction and biometric sensor data of web page users to extrapolate emotional responses to a web page and generating an aggregated emotional map indicative of the emotional responses according to illustrative embodiments.

Referring now to FIG. 4, in conjunction with FIG. 2, an implementation of a process flowchart 400 for gathering time-annotated web interaction and biometric sensor data of web page users to extrapolate emotional responses to a web page and generating an aggregated emotional map indicative of the emotional responses is shown. At step 402, physical interaction component 210 captures and records what a user is doing and seeing in real time on every page and across all website visits, down to the page-by-page, browser-level experience. At step 404, emotional interaction component 215 captures and records time-annotated biometric data related to a user's website interaction using one or more biometric sensors. At step 406, comprehensive user component 220 determines the emotional state of a user regarding defined web page sections based on the time-annotated physical interaction data and biometric data. At step 408, aggregation component 225 aggregates the emotional states of all or a subsection (e.g., by gender, age, etc.) of users over a predefined and/or configurable time range (e.g., past week, past month, etc.) for each defined web page section to augment, at step 410, any number of the defined web page sections. In an embodiment, the aggregated data can be used to generate an emotional or heat map of a web page by color-coding one or more web page sections of the web page using predefined and/or configurable emotional response rules.

Process flowchart 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for gathering time-annotated web interaction and biometric sensor data of web page users to extrapolate emotional responses to a web page and generating an aggregated emotional map indicative of the emotional responses. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for gathering time-annotated web interaction and biometric sensor data of web page users to extrapolate emotional responses to a web page and generating an aggregated emotional map indicative of the emotional responses. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises a document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for gathering time-annotated web interaction and biometric sensor data of web page users to extrapolate emotional responses to a web page and generating an aggregated emotional map indicative of the emotional responses. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for augmenting web content, the method comprising:
    capturing physical interaction data of a user including an interaction timestamp related to a web page section of a web page;
    capturing biometric data of the user including a sensor timestamp and a location on the web page section from one or more biometric sensors;
    correlating the interaction timestamp with the sensor timestamp and location to determine an emotional state related to the web page section;
    aggregating, to determine an aggregated emotional state, the emotional state related to the web page section with a plurality of emotional states corresponding to a plurality of other users related to the web page section stored in a repository;
    assigning an augmentation indicator of a plurality of augmentation indicators to each emotional state of a plurality of emotional states; and
    augmenting, based on the aggregation, the web page section to display to an administrative user by indicating, on a heat map of the web page, the first web page section augmented using a first augmentation indicator indicating that the aggregated emotional state of the web page section exceeds a first percentage threshold corresponding to a first emotional state, and a second web page section augmented using a second augmentation indication indicating that the aggregated emotional states of the second web page exceeds a second percentage threshold corresponding to a second emotional state.

2. The computer-implemented method of claim 1, wherein the physical interaction data is selected from a group consisting of a referring domain, a referring uniform resource locator (URL), browser agent information, an originating Internet Protocol (IP) address, one or more mouse events, one or more keyboard events, one or more screenshots of a user's view, event data, event object data, click location, event time, event duration, one or more link events, one or more link object names, one or more link object values, one or more link destinations, browser size, device screen size, form data, one or more interactions within media files, one or more partial form completions, and one or more submitted forms.

3. The computer-implemented method of claim 1, wherein the biometric data is selected from a group consisting of galvanic skin response to measure emotional arousal, heart response, motion to determine activity level, skin temperature, breathing, muscle tension, blood pressure, sedation level, pupil dilation, eye tracking, and one or more facial expressions.

4. The computer-implemented method of claim 1,
    wherein each of the plurality of augmentation indicators is a color, and
    wherein the augmenting of the web page section is performed by shading the web page section with a predefined color that corresponds to a first emotion based on the aggregated emotional state of the web page section and shading a second web page selection with a different predefined color that corresponds to a second emotion based on the aggregated emotional state of the second web page selection.

5. The computer-implemented method of claim 4, wherein the web page section is shaded with the predefined color when a percentage associated with the aggregated emotional state exceeds a predefined threshold value, wherein the aggregated emotional state is selected from a group consisting of any emotional response derived from the biometric data.

6. The computer-implemented method of claim 5, wherein the location includes X and Y screen coordinates related to the web page section.

7. The computer-implemented method of claim 1, further generating one or more statistics for display based on an aggregation of an emotional state related to one or more web page sections.

8. A computer program product for augmenting web content, the computer program product comprising a computer readable storage device, and program instructions stored on the computer readable storage device, to:
  capture physical interaction data of a user including an interaction timestamp related to a web page section of a web page;
  capture biometric data of the user including a sensor timestamp and a location on the web page section from one or more biometric sensors;
  correlate the interaction timestamp with the sensor timestamp and the location to determine an emotional state related to the web page section;
  aggregate, to determine an aggregated emotional state, the emotional state related to the web page section with a plurality of emotional states corresponding to a plurality of other users related to the web page section stored in a repository;
  assign an augmentation indicator of a plurality of augmentation indicators to each emotional state of a plurality of emotional states; and
  augment, based on the aggregation, the web page section to display to an administrative user by indicating, on a heat map of the web page, the first web page section augmented using a first augmentation indicator indicating that the aggregated emotional state of the web page section exceeds a first percentage threshold corresponding to a first emotional state, and a second web page section augmented using a second augmentation indication indicating that the aggregated emotional states of the second web page exceeds a second percentage threshold corresponding to a second emotional state.

9. The computer program product of claim 8, wherein the physical interaction data is selected from a group consisting of a referring domain, a referring uniform resource locator (URL), browser agent information, an originating Internet Protocol (IP) address, one or more mouse events, one or more keyboard events, one or more screenshots of a user's view, event data, event object data, click location, event time, event duration, one or more link events, one or more link object names, one or more link object values, one or more link destinations, browser size, device screen size, form data, one or more interactions within media files, one or more partial form completions, and one or more submitted forms.

10. The computer program product of claim 8, wherein the biometric data is selected from a group consisting of galvanic skin response to measure emotional arousal, heart response, motion to determine activity level, skin temperature, breathing, muscle tension, blood pressure, sedation level, pupil dilation, eye tracking, and one or more facial expressions.

11. The computer program product of claim 8,
  wherein each of the plurality of augmentation indicators is a color, and
  wherein the program instructions to augment the web page section are performed by shading the web page section with a predefined color that corresponds to a first emotion based on the aggregated emotional state of the web page section and shading a second web page selection with a different predefined color that corresponds to a second emotion based on the aggregated emotional state of the second web page selection.

12. The computer program product of claim 11, wherein the web page section is shaded with the predefined color when a percentage associated with the aggregated emotional state exceeds a predefined threshold value, wherein the aggregated emotional state is selected from a group consisting any emotional response derived from the biometric data.

13. The computer program product of claim 12, wherein the location includes X and Y screen coordinates related to the web page section.

14. The computer program product of claim 8, further comprising program instructions to generate one or more statistics for display based on an aggregation of an emotional state related to one or more web page sections.

15. A computer system for augmenting web content, the computer system comprising:
  a memory medium comprising program instructions;
  a bus coupled to the memory medium; and
  a processor for executing the program instructions, the instructions causing the system to:
    capture physical interaction data of a user including an interaction timestamp related to a web page section of a web page;
    capture biometric data of the user including a sensor timestamp and a location on the web page section from one or more biometric sensors;
    correlate the interaction timestamp with the sensor timestamp and the location to determine an emotional state related to the web page section;
    aggregate, to determine an aggregated emotional state, the emotional state related to the web page section with a plurality of emotional states corresponding to a plurality of other users related to the web page section stored in a repository;
    assign an augmentation indicator of a plurality of augmentation indicators to each emotional state of a plurality of emotional states; and
    augment, based on the aggregation, the web page section to display to an administrative user by indicating, on a heat map of the web page, the first web page section augmented using a first augmentation indicator indicating that the aggregated emotional state of the web page section exceeds a first percentage threshold corresponding to a first emotional state, and a second web page section augmented using a second augmentation indication indicating that the aggregated emotional states of the second web page exceeds a second percentage threshold corresponding to a second emotional state.

16. The computer system of claim 15, wherein the physical interaction data is selected from a group consisting of a referring domain, a referring uniform resource locator (URL), browser agent information, an originating Internet Protocol (IP) address, one or more mouse events, one or more keyboard events, one or more screenshots of a user's view, event data, event object data, click location, event time, event duration, one or more link events, one or more link object names, one or more link object values, one or more link destinations, browser size, device screen size, form data, one or more interactions within media files, one or more partial form completions, and one or more submitted forms.

17. The computer system of claim 15, wherein the biometric data is selected from a group consisting of galvanic skin response to measure emotional arousal, heart response, motion to determine activity level, skin temperature, breathing, muscle tension, blood pressure, sedation level, pupil dilation, eye tracking, and one or more facial expressions.

18. The computer system of claim 15,
  wherein each of the plurality of augmentation indicators is a color, and
  wherein the program instructions to augment the web page section are performed by shading the web page section with a predefined color that corresponds to a first emotion based on the aggregated emotional state of the web page section and shading a second web page selection with a different predefined color that corresponds to a second emotion based on the aggregated emotional state of the second web page selection.

19. The computer system of claim 18, wherein the web page section is shaded with the predefined color when a percentage associated with the aggregated emotional state exceeds a predefined threshold value, wherein the aggregated emotional state is selected from a group consisting of any emotional response derived from the biometric data.

20. The computer system of claim 19, wherein the location includes X and Y screen coordinates related to the web page section.

\* \* \* \* \*